(12) United States Patent
Nonaka et al.

(10) Patent No.: US 11,287,694 B2
(45) Date of Patent: Mar. 29, 2022

(54) UPPER SIDE LIGHT DIFFUSER SHEET AND BACKLIGHT UNIT INCLUDING THE SAME

(71) Applicant: KEIWA INC., Tokyo (JP)

(72) Inventors: Tadayuki Nonaka, Wakayama (JP); Kana Miyamoto, Wakayama (JP); Hiroki Maeda, Wakayama (JP)

(73) Assignee: KEIWA INC., Tokyo (JP)

( * ) Notice: Subject to any disclaimer, the term of this patent is extended or adjusted under 35 U.S.C. 154(b) by 108 days.

(21) Appl. No.: 16/619,902

(22) PCT Filed: May 15, 2018

(86) PCT No.: PCT/JP2018/018661
§ 371 (c)(1),
(2) Date: Dec. 5, 2019

(87) PCT Pub. No.: WO2018/225463
PCT Pub. Date: Dec. 13, 2018

(65) Prior Publication Data
US 2021/0149252 A1 May 20, 2021

(30) Foreign Application Priority Data
Jun. 6, 2017 (JP) .............................. JP2017-111848

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01)

(58) Field of Classification Search
CPC ................................................ G02F 1/133607
See application file for complete search history.

(56) References Cited

U.S. PATENT DOCUMENTS

| 2012/0195050 A1* | 8/2012 | Pokorny | G02B 5/02 362/311.03 |
|---|---|---|---|
| 2018/0252848 A1* | 9/2018 | Ludemann | G02B 1/111 |

FOREIGN PATENT DOCUMENTS

| JP | 2005077448 A | 3/2005 |
|---|---|---|
| JP | 2009222968 A | 10/2009 |
| JP | 2009237148 A | 10/2009 |

(Continued)

OTHER PUBLICATIONS

International Search Report for PCT/JP2018/018661, dated Aug. 7, 2018.

*Primary Examiner* — Julie A Bannan
(74) *Attorney, Agent, or Firm* — Marshall, Gerstein & Borun LLP

(57) ABSTRACT

An upper side light diffuser sheet includes a substrate layer, and a light diffusion layer overlaid on a front face side of the substrate layer. The light diffusion layer includes a resin matrix, and resin beads dispersed in the resin matrix. The resin beads include a first resin bead group having an average particle diameter D50 of 1.9 μm or more and 3.3 μm or less, and a second resin bead group having an average particle diameter D50 larger than the average particle diameter D50 of the first resin bead group. A mass ratio of the second resin bead group in an entire resin beads is 30% or more and 50% or less. A coating amount of the light diffusion layer is larger than 1.7 g/m² and smaller than 3.0 g/m².

4 Claims, 6 Drawing Sheets

(56) References Cited

FOREIGN PATENT DOCUMENTS

| | | | |
|---|---|---|---|
| JP | 2010211027 | A | 9/2010 |
| JP | 2016212191 | A | 12/2016 |
| KR | 10-2012-0085755 | A | 8/2012 |
| WO | WO-2017/030101 | A1 | 2/2017 |

* cited by examiner

[Fig. 1]
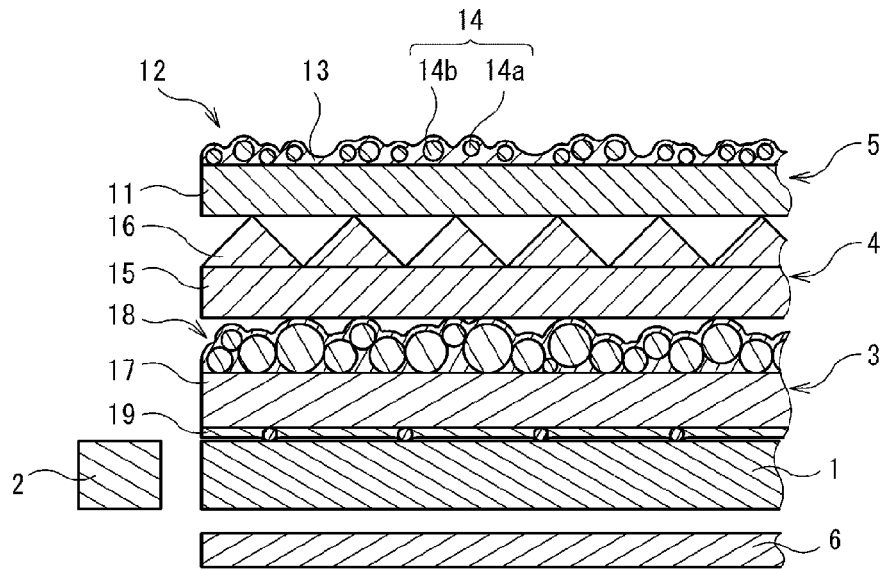
[Fig. 2]
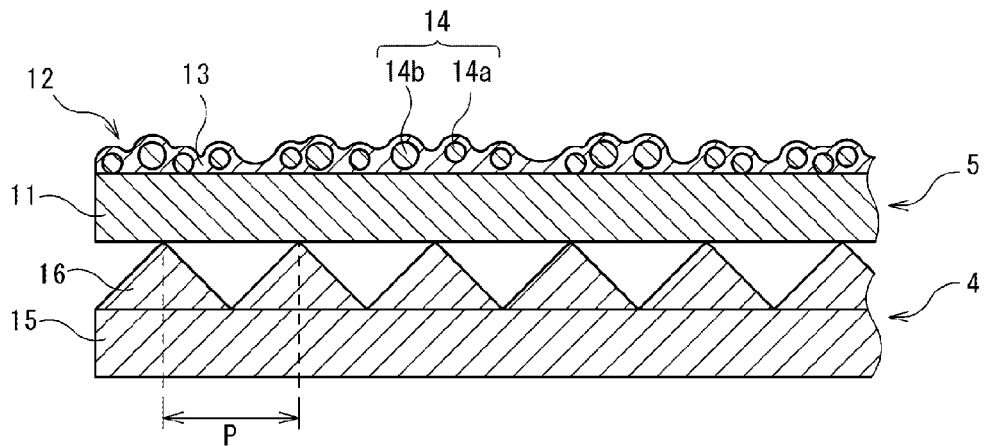
[Fig. 3]
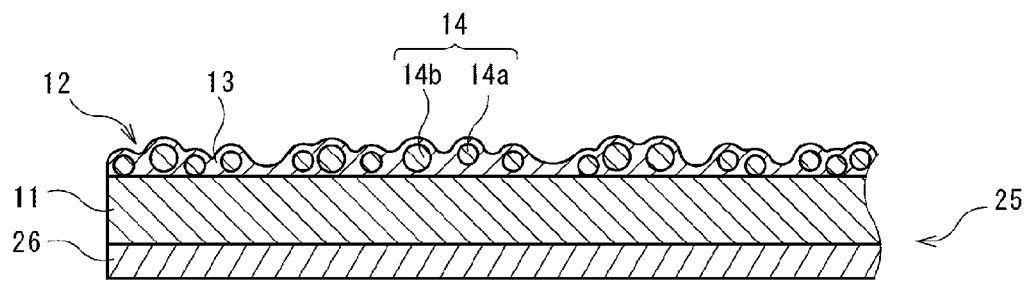

[Fig. 4]
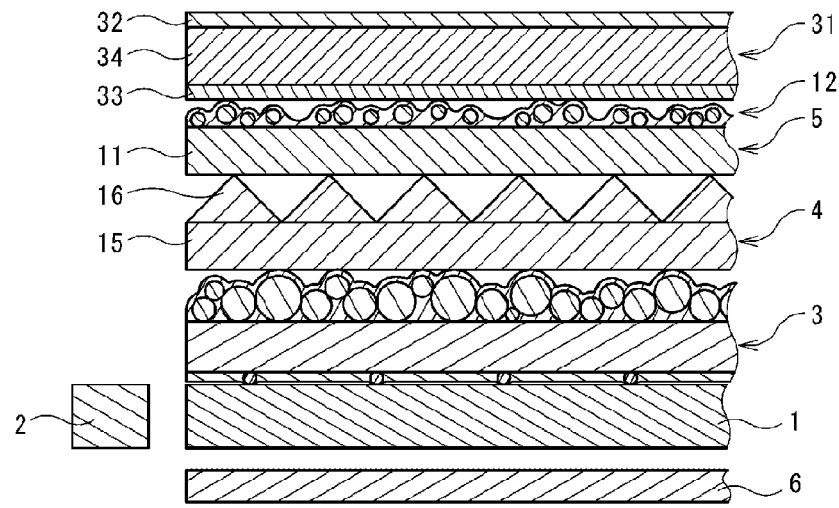
[Fig. 5]
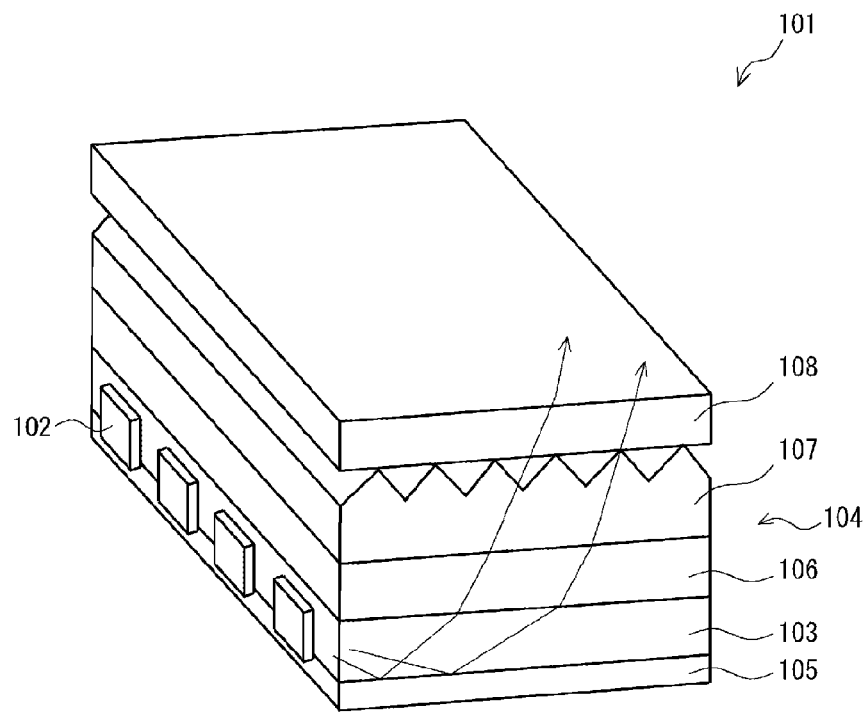

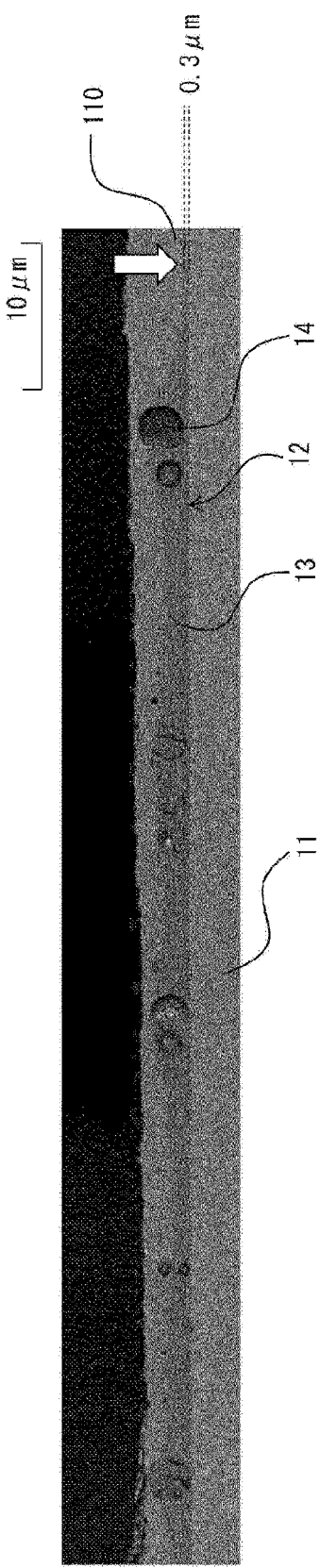
[Fig. 6A]

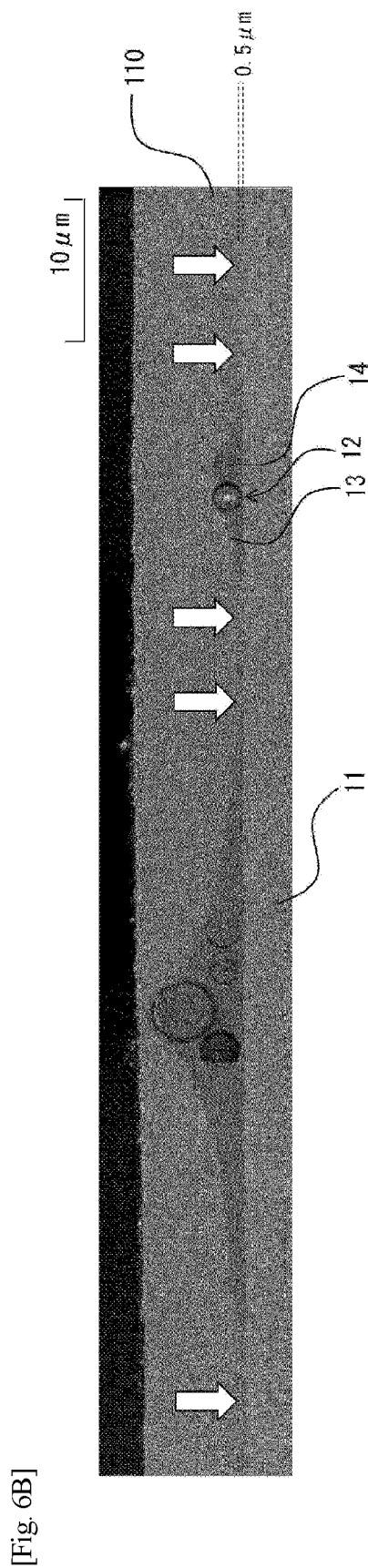
[Fig. 6B]

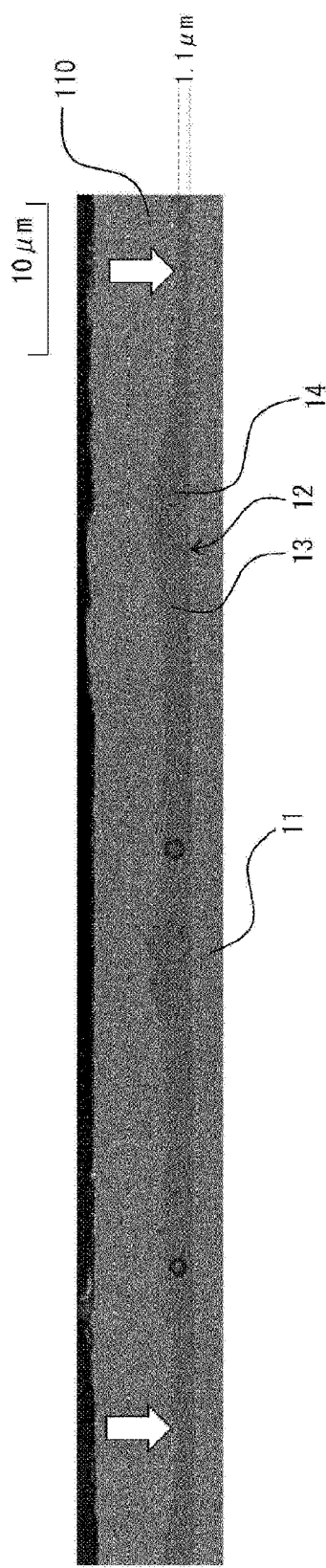
[Fig. 7A]

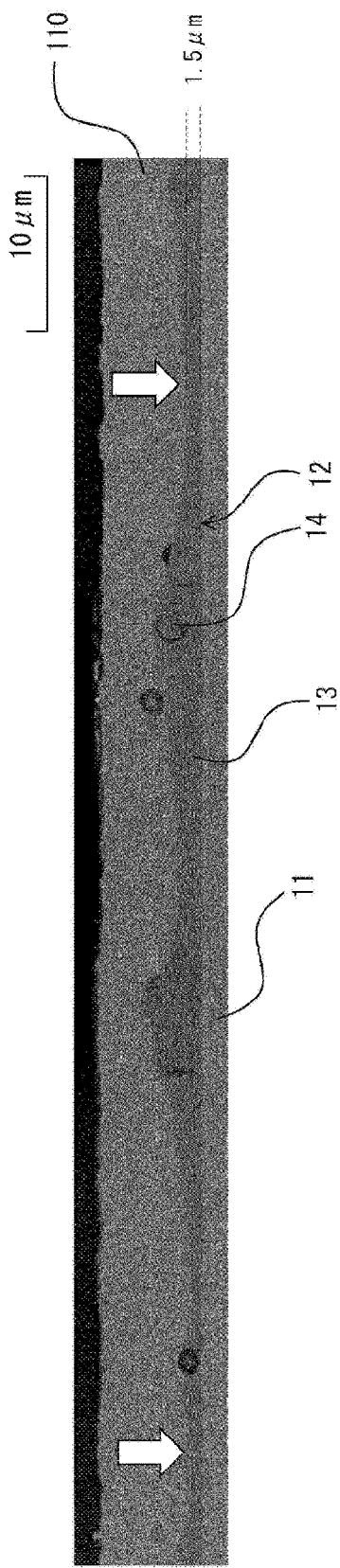
[Fig. 7B]

UPPER SIDE LIGHT DIFFUSER SHEET AND BACKLIGHT UNIT INCLUDING THE SAME

TECHNICAL FIELD

The present invention relates to an upper side light diffuser sheet and a backlight unit including the same.

BACKGROUND ART

Liquid crystal display devices are intensively used as flat panel displays taking advantages of characteristic features such as thin modeling, weight saving and low electric power consumption, and use thereof has been increasing over time, such as televisions, personal computers, mobile phone terminals such as smartphones, portable information terminals such as tablet terminals, and the like.

As such liquid crystal display devices, those of a backlight system in which a liquid crystal panel is irradiated from the back face side are in widespread use, which are equipped with a backlight unit of an edge light type (side light type), a direct light type or the like. The edge light backlight unit 101 provided in such a liquid crystal display device include, as shown in FIG. 5 in general, a light source 102, a rectangular plate-shaped light guide plate 103 arranged to be aligned with the light source 102 along the ends thereof, a plurality of optical sheets 104 disposed to overlay a front face side of the light guide plate 103, and a reflection sheet 105 disposed on a back face side of the light guide plate 103. The light guide plate 103 is generally made of a synthetic resin, in which a polycarbonate, an acrylic resin or the like is used as a principal component. As the light source 102, a light emitting diode (LED), a cold-cathode tube or the like is used, and LEDs are currently widely used from the viewpoint of miniaturization, energy saving, and the like. In addition, as the optical sheet 104, (1) a lower side light diffuser sheet 106 superposed on a front face side of the light guide plate 103, mainly having a light diffusion function, (2) a prism sheet 107 superposed on a front face side of the lower side light diffuser sheet 106, having a refraction function toward a normal direction side, and (3) an upper side light diffuser sheet 108 superposed on a front face side of the prism sheet 107, inhibiting luminance unevenness resulting from the shape and the like of prism portions of the prism sheet 107 through slightly diffusing rays of light are used (see JP 2005-77448 A). Moreover, as the upper side light diffuser sheet, a sheet including a substrate layer and a light diffusion layer overlaid on the front face side of the substrate layer and having a resin matrix and resin beads is generally used.

CITATION LIST

Patent Literature

PTL 1: JP 2005-77448 A

SUMMARY OF INVENTION

Technical Problem

However, it has been proven that when such a conventional upper side light diffuser sheet is used in a liquid crystal display device in which minimization of a pixel pitch of a liquid crystal panel is promoted, a sparkle (also referred to as "glare", "graininess", "shimmering", "interference of light", "unevenness" or "bright spot") resulting from interference with the pixel pitch of the liquid crystal panel disposed on a front face side of the upper side light diffuser sheet is generated.

The above problems may occur in a light diffuser sheet arranged in any position (for example, a front face light diffuser sheet positioned on the front side of the liquid crystal panel from the upper side light diffuser sheet) as long as it is a light diffuser sheet. However, due to a difference in the purpose of each light diffuser sheet, the same technique as other light diffuser sheets cannot be applied as it is to the upper side light diffuser sheet that requires high light diffusibility.

That is, for example, since light diffused in advance by the upper side light diffuser sheet enters on the front face light diffuser sheet, light diffusibility of the front face light diffuser sheet itself is not so limited. Therefore, in the case of the front face light diffuser sheet, a low haze value is allowed. However, in the upper side light diffuser sheet, since the light diffusibility of the upper side light diffuser sheet is a major factor that determines the light diffusibility of light from a light source in an entire liquid crystal panel, the light diffusibility of the upper side light diffuser sheet must be increased and the haze value cannot be reduced. In addition, since the front face light diffuser sheet requires hard coat properties, it is necessary to increase the coating amount on the front face light diffuser sheet in order to achieve the hard coat properties. Therefore, when such a coating amount is applied to the upper side light diffuser sheet as it is, sparkle easily occurs.

The present invention has been made in view of the foregoing circumstances, and an object of the invention is to provide an upper side light diffuser sheet, and a backlight unit including the same that are each capable of inhibiting generation of sparkle, while maintaining the high light diffusibility required as the upper side light diffuser sheet.

Solution to Problem

An upper side light diffuser sheet according to an aspect of the present invention is an upper side light diffuser sheet to be disposed on a front face side of a prism sheet in a backlight unit of a liquid crystal display device, the upper side light diffuser sheet including a substrate layer, and a light diffusion layer overlaid on a front face side of the substrate layer, in which the light diffusion layer includes a resin matrix, and resin beads dispersed in the resin matrix, the resin beads include a first resin bead group having an average particle diameter D50 of 1.9 μm or more and 3.3 μm or less, and a second resin bead group having an average particle diameter D50 larger than the average particle diameter D50 of the first resin bead group, a mass ratio of the second resin bead group in an entire resin beads is 30% or more and 50% or less, and a coating amount of the light diffusion layer is larger than 1.7 g/m² and smaller than 3.0 g/m².

According to the above structure, since the light diffusion layer includes the resin matrix and the resin beads, irregularities resulting from the resin beads are formed on the front face of the light diffusion layer. Therefore, the upper side light diffuser sheet can inhibit luminance unevenness resulting from a shape and the like of protruding prism portions of a prism sheet by allowing rays of light having entered from a back face side to be diffused by means of the irregularities.

Also, the first resin bead group having a relatively small average particle diameter of the resin beads and the second resin bead group having an average particle diameter of the resin beads larger than that of the first resin bead group are included, and the mass ratio of which is within the above range, whereby it is possible to prevent the upper side light diffuser sheet from being scratched while maintaining the light diffusibility. That is, when the mass ratio of the second resin bead group exceeds the upper limit of the above range, the haze value decreases, and the light diffusibility as the upper side light diffuser sheet cannot be maintained. On the other hand, when the mass ratio of the second resin bead group is below the lower limit of the above range, the front face of the upper side light diffuser sheet is easily scratched.

Furthermore, when the coating amount of the light diffusion layer is set within the above range, it is possible to inhibit the generation of sparkle while maintaining a high haze value. That is, when the coating amount of the light diffusion layer exceeds the upper limit of the above range, the resin beads are buried in the resin matrix, and the haze value decreases. In addition, since the coating amount is large, the resin beads in the light diffusion layer are likely to be biased, and sparkle is easily generated. On the other hand, when the coating amount of the light diffusion layer is below the lower limit of the above range, the resin beads are easily peeled off, the haze value becomes too high, and the luminance decreases.

From the above, by setting the mass ratio of the first resin bead group and the second resin bead group and the coating amount of the light diffusion layer within the above ranges, the generation of sparkle can be inhibited while maintaining the high light diffusibility required as the upper side light diffuser sheet.

The light diffusion layer may have a minimum thickness in a region where the resin beads are not present in the thickness direction of greater than 0 and 1 μm or less. When the minimum thickness of the light diffusion layer (resin matrix) where the resin beads are not present in the thickness direction is greater than 1 μm, a proportion of resin bead (single) embedded in the resin matrix increases, and a convex shape of the resin bead is not formed as the original design. That is, convex portions generated by the resin beads in the light diffusion layer are lowered, and light diffusion performance is lowered. For this reason, by setting the minimum thickness to be greater than 0 and 1 μm or less, the generation of sparkle can be more effectively inhibited.

A mass content of the resin beads in the light diffusion layer may be 37% or more and 47% or less. When the mass content of the resin beads is small and below the lower limit of this range, the haze value decreases, and sparkle is easily generated. On the other hand, when the mass content of the resin beads is high and exceeds the upper limit of this range, the haze value becomes excessively high, and the luminance decreases. Therefore, by setting the mass content of the resin beads in the light diffusion layer in the above range, high luminance can be obtained while inhibiting the generation of sparkle.

The second resin bead group may have an average particle diameter D50 of 5.0 μm or more and 6.5 μm or less.

Further, the backlight unit according to another aspect of the present invention includes a light guide sheet that guides rays of light that enter from an end face to a front face side, a light source that allows an end face of the light guide sheet to be irradiated with rays of light, a lower side light diffuser sheet superposed on a front face side of the light guide sheet, a prism sheet disposed on a front face side of the lower side light diffuser sheet, and an upper side light diffuser sheet superposed on a front face side of the prism sheet, in which an upper side light diffuser sheet of the above structure is used as the upper side light diffuser sheet.

In the backlight unit, since the upper side light diffuser sheet of the above structure is superposed on the front face side of the prism sheet, luminance unevenness resulting from the shape and the like of the prism portions of the prism sheet can be inhibited by allowing rays of light that exit from the prism sheet to be diffused by means of irregularities formed on the front face of the light diffusion layer of the upper side light diffuser sheet. In addition, by setting the mass ratio of the first resin bead group and the second resin bead group and the coating amount of the light diffusion layer within the above ranges, the generation of sparkle can be inhibited while maintaining the high light diffusibility required as the upper side light diffuser sheet.

It is to be noted that as referred to herein the term "front face side" means a side of a viewer for the liquid crystal display device, whereas the term "back face side" means its reverse side.

Advantageous Effects of Invention

As explained in the foregoing, the upper side light diffuser sheet and the backlight unit of the present invention can inhibit the generation of sparkle while maintaining the high light diffusibility required as the upper side light diffuser sheet.

BRIEF DESCRIPTION OF DRAWINGS

FIG. 1 is a schematic cross sectional view illustrating a backlight unit according to an embodiment of the present invention.

FIG. 2 is a schematic cross sectional view illustrating a state of disposing an upper side light diffuser sheet and a prism sheet in the backlight unit shown in FIG. 1.

FIG. 3 is a schematic cross sectional view illustrating an upper side light diffuser sheet according to a modified example of the embodiment of the present invention.

FIG. 4 is a schematic cross sectional view illustrating a liquid crystal display module according to an embodiment of the present invention.

FIG. 5 is a schematic perspective view illustrating a conventional edge light backlight unit.

FIG. 6A is a laser microscopic view illustrating a cross section of a light diffuser sheet in Example 6 of the present invention.

FIG. 6B is a laser microscopic view illustrating a cross section of a light diffuser sheet in Example 7 of the present invention.

FIG. 7A is a laser microscopic view illustrating a cross section of a light diffuser sheet in Comparative Example 6.

FIG. 7B is a laser microscopic view illustrating a cross section of a light diffuser sheet in Comparative Example 7.

DESCRIPTION OF EMBODIMENTS

Hereinafter, embodiments of the present invention will be explained in detail in reference to the drawings as appropriate.

[Backlight Unit]

The backlight unit of the liquid crystal display device shown in FIG. 1 includes a prism sheet 4, and an upper side light diffuser sheet 5 disposed on a front face side of the prism sheet 4. The backlight unit is an edge light backlight unit, and includes a light guide sheet 1 that guides rays of light that enter from an end face to a front face side, a light source 2 that allows an end face of the light guide sheet 1 to be irradiated with rays of light, a lower side light diffuser sheet 3 superposed on a front face side of the light guide sheet 1, the prism sheet 4 disposed on a front face side of the lower side light diffuser sheet 3, and the upper side light diffuser sheet 5 superposed on the front face side of the prism sheet 4. In addition, the backlight unit further includes a reflection sheet 6 disposed on a back face side of the light guide sheet 1. The lower side light diffuser sheet 3 allows the rays of light that enter from the back face side to be condensed, to a normal direction side while allowing light diffusion (allowing for light condensing diffusion). The prism sheet 4 reflects the rays of light that enter from the back face side, toward the normal direction side. The upper side light diffuser sheet 5 allows the rays of light that enter from the back face side to be diffused, thereby inhibiting luminance unevenness resulting from the shape and the like of prism portions of the prism sheet 4, and inhibiting generation of a sparkle resulting from interference with a pixel pitch of a liquid crystal panel (not shown) disposed on the front face side of the upper side light diffuser sheet 5. The reflection sheet 6 reflects the rays of light that exit from the back face side of the light guide sheet 1 to the front face side, and thus the rays of light again enter the light guide sheet 1.

<Upper Side Light Diffuser Sheet>

The upper side light diffuser sheet 5 is disposed on the front face side of the prism sheet 4 in the backlight unit of a liquid crystal display device, and in this embodiment, the upper side light diffuser sheet 5 is directly superposed (without any other sheet of the like being interposed) on the front face of the prism sheet 4 in particular. The upper side light diffuser sheet 5 includes a substrate layer 11, and a light diffusion layer 12 overlaid on the front face side of the substrate layer 11. The upper side light diffuser sheet 5 is constituted as a two-layer structure that includes the substrate layer 11 and the light diffusion layer 12 overlaid directly on the front face of the substrate layer 11.

(Substrate Layer)

Since the substrate layer 11 is required to transmit rays of light, the substrate layer 11 is formed mainly of a synthetic resin that is transparent, particularly colorless transparent. The principal component of the substrate layer 11 is not particularly limited, and examples thereof include polyethylene terephthalate, polyethylene naphthalate, an acrylic resin, a polycarbonate, a polystyrene, a polyolefin, cellulose acetate, weather resistant vinyl chloride, and the like. Among them, polyethylene terephthalate having superior transparency and high strength is preferred, and polyethylene terephthalate having improved deflection performance is particularly preferred. It is to be noted that the "principal component" as referred to means a component the content of which is highest, and for example, a component contained in an amount of 50% or more.

The lower limit of the average thickness of the substrate layer 11 is preferably 10 µm, more preferably 35 µm, and further preferably 50 µm. On the other hand, the upper limit of the average thickness of the substrate layer 11 is preferably 500 µm, more preferably 250 µm, and further preferably 188 µm. When the average thickness of the substrate layer 11 is less than the lower limit, curling may occur in the case of forming the light diffusion layer 12 by coating. To the contrary, when the average thickness of the substrate layer 11 is greater than the upper limit, the luminance of the liquid crystal display device may decrease, and the demand for reduction in thickness of the liquid crystal display device may not be satisfied. It is to be noted that the "average thickness" as referred to means an average value of the thicknesses at arbitrary 10 points.

(Light Diffusion Layer)

The light diffusion layer 12 constitutes the outermost surface of the upper side light diffuser sheet 5. The light diffusion layer 12 includes a resin matrix 13, and resin beads 14 dispersed in the resin matrix 13. The light diffusion layer 12 contains the resin beads 14 being dispersed with a substantially equal density. The resin beads 14 are surrounded by the resin matrix 13. The light diffusion layer 12 allows rays of light to be diffused outward by means of fine irregularities formed on the front face.

The lower limit of the average thickness of the light diffusion layer 12 is 2 µm, and more preferably 3 µm. On the other hand, the upper limit of the average thickness of the light diffusion layer 12 is 9 µm, more preferably 7 µm, and further preferably 5 µm. When the average thickness of the light diffusion layer 12 is less than the lower limit, it may be impossible to accurately fix the resin beads 14 by the resin matrix 13, and thus the resin beads 14 may be detached from the light diffusion layer 12. To the contrary, when the average thickness of the light diffusion layer 12 is greater than the upper limit, it may be difficult to form the fine and highly dense irregularities on the front face of the light diffusion layer 12, and consequently it may be impossible to sufficiently inhibit the generation of the sparkle resulting from the interference with the pixel pitch of the liquid crystal panel disposed on the front face side of the upper side light diffuser sheet 5.

Since the resin matrix 13 is required to transmit rays of light, the resin matrix 13 is formed mainly of a synthetic resin that is transparent, particularly colorless transparent. Examples of the synthetic resin include thermosetting resins and active energy ray-curable resins. Among them, the synthetic resin is preferably an active energy ray-curable resin which is more likely to retain the resin beads 14 in a state of being spaced away from the front face of the substrate layer 11 as described later.

Examples of the thermosetting resin include epoxy resins, silicone resins, phenol resins, urea resins, unsaturated polyester resins, melamine resins, alkyd resins, polyimide resins, acrylic resins, amide functional copolymers, urethane resins, and the like.

Examples of the active energy ray-curable resin include ultraviolet-curable resins that are crosslinked and hardened by irradiation with an ultraviolet ray, electron beam-curable resins that is crosslinked and hardened by irradiation with an electron beam, and the like, which can be appropriately selected for use from among polymerizable monomers and polymerizable oligomers. Among them, the active energy ray-curable resin is preferably an acrylic, urethane-based or acrylic urethane-based ultraviolet-curable resin that improves adhesion to the substrate layer 11, and easily prevents detachment of the resin beads 14 from the light diffusion layer 12.

As the polymerizable monomer, a (meth)acrylate monomer having a radically polymerizable unsaturated group in its molecule may be suitably used, and in particular, a polyfunctional (meth)acrylate is preferred. The polyfunctional (meth)acrylate is not particularly limited as long as it is a (meth)acrylate having at least two ethylenically unsaturated bonds in its molecule. Specific examples include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentylglycol di(meth)acrylate, dicyclopentanyl di(meth)acrylate, caprolactone modified dicyclopentenyl di(meth) acrylate, ethylene oxide modified phosphate di(meth)

acrylate, allylated cyclohexyl di(meth)acrylate, isocyanurate di(meth)acrylate, trimethylolpropane tri(meth)acrylate, ethylene oxide modified trimethylolpropane tri(meth)acrylate, dipentaerythritol tri(meth)acrylate, propionic acid modified dipentaerythritol tri(meth)acrylate, pentaerythritol tri(meth) acrylate, propylene oxide modified trimethylolpropane tri (meth)acrylate, tris(acryloxyethyl)isocyanurate, propionic acid modified dipentaerythritol penta(meth)acrylate, dipentaerythritol hexa(meth)acrylate, ethylene oxide modified dipentaerythritol hexa(meth)acrylate, caprolactone modified dipentaerythritol hexa(meth)acrylate, and the like. These polyfunctional (meth)acrylates may be used alone, or in combination of two or more thereof. Among them, dipentaerythritol tri(meth)acrylate is preferred.

Moreover, in addition to the polyfunctional (meth)acrylate, a monofunctional (meth)acrylate may be further included for the purpose of reducing the viscosity or the like. Examples of the monofunctional (meth)acrylate include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used alone, or in combination of two or more thereof.

The polymerizable oligomer includes oligomers having radically polymerizable unsaturated groups in its molecule, and examples thereof include epoxy (meth)acrylate oligomers, urethane (meth)acrylate oligomers, polyester (meth) acrylate oligomers, polyether (meth)acrylate oligomers, and the like.

The epoxy (meth)acrylate oligomer can be obtained by reacting, for example, an oxirane ring of a bisphenol epoxy resin or novolac epoxy resin having a comparatively low molecular weight with a (meth)acrylic acid to permit esterification. Alternatively, a carboxyl modified epoxy (meth) acrylate oligomer can be also used which is obtained by partially modifying the epoxy (meth)acrylate oligomer with a dibasic carboxylic anhydride. The urethane (meth)acrylate oligomer can be obtained, for example, by esterifying with a (meth)acrylic acid, a polyurethane oligomer obtained by a reaction of a polyether polyol and/or a polyester polyol with a polyisocyanate. The polyester (meth)acrylate oligomer can be obtained, for example, by esterifying with a (meth)acrylic acid, hydroxyl groups of a polyester oligomer having hydroxyl groups at both ends obtained by condensation of a polyhydric carboxylic acid with a polyhydric alcohol. Alternatively, it is also possible to obtain the polyester (meth) acrylate oligomer by esterifying with a (meth)acrylic acid, hydroxyl groups at ends of an oligomer obtained by imparting an alkylene oxide to a polyhydric carboxylic acid. The polyether (meth)acrylate oligomer can be obtained by esterifying with a (meth)acrylic acid, hydroxyl groups of a polyether polyol.

Moreover, as the active energy ray-curable resin, an ultraviolet-curable epoxy resin is also suitably used. Examples of the ultraviolet-curable epoxy resin include cured products such as a bisphenol A epoxy resin and a glycidyl ether epoxy resin. Due to the resin matrix 13 containing the ultraviolet-curable epoxy resin as a principal component, the upper side light diffuser sheet 5 can readily form irregularities with a desired shape on the front face side of the substrate layer 11 while volumetric shrinkage is suppressed during the curing. In addition, due to the resin matrix 13 containing the ultraviolet-curable epoxy resin as a principal component, the upper side light diffuser sheet 5 increases flexibility of the resin matrix 13, whereby it is possible to increase a scratch preventive property on the liquid crystal panel and the like disposed on the front face of the upper side light diffuser sheet 5. Furthermore, when the ultraviolet-curable epoxy resin is used as the active energy ray-curable resin, it is preferred that other polymerizable monomer and polymerizable oligomer such as the (meth) acrylate monomer and (meth)acrylate oligomer are not contained. Accordingly, the flexibility of the resin matrix 13 is further increased, whereby the scratch preventive property can be further improved.

When an ultraviolet-curable resin is used as the active energy ray-curable resin, it is desirable that an initiator for photopolymerization is added in an amount of about 0.1 parts by mass or more and 5 parts by mass or less with respect to 100 parts by mass of the resin. The initiator for photopolymerization is not particularly limited, and for the polymerizable monomer and/or the polymerizable oligomer having a radically polymerizable unsaturated group in its molecule, examples of the initiator include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1-one, 2-hydroxy-2-methyl-1-phenylpropan-1-one, 1-hydroxycyclohexyl phenyl ketone, 2-methyl-1-[4-(methylthio)phenyl]-2-morpholinopropanone-1, 1-[4-(2-hydroxyethoxy)-phenyl]-2-hydroxy-2-methyl-1-propan-1-one, bis (cyclopentadienyl)-bis[2,6-difluoro-3-(pyrrol-1-yl)phenyl] titanium, 2-benzyl-2-dimethylamino-1-(4-morpholinophenyl)-butanone-1, 2,4,6-trimethylbenzoyldiphenyl phosphine oxide, and the like. Moreover, for the polymerizable oligomer having a cation polymerizable functional group in its molecule, and the like, examples of the initiator include aromatic sulfonium salts, aromatic diazonium salts, aromatic iodonium salts, metallocene compounds, benzoinsulfonic acid esters, and the like. It is to be noted that these compounds may be used each alone, or as a mixture of a plurality of the compounds.

It is to be noted that the resin matrix 13 can also contain other additive in addition to the synthetic resin described above. Examples of the additive include a silicone-based additive, a fluorine-based additive, and an antistatic agent, and the like. Moreover, the content of the additive with respect to 100 parts by mass of the synthetic resin component in the resin matrix 13 in terms of the solid content can be, for example, 0.05 parts by mass or more and 5 parts by mass or less.

The resin beads 14 are resin particles having a property of transmitting and diffusing rays of light. The resin beads 14 are formed mainly of a synthetic resin that is transparent, particularly colorless transparent. Examples of the principal component of the resin beads 14 include an acrylic resin, an acrylonitrile resin, polyurethane, polyvinyl chloride, polystyrene, polyamide, polyacrylonitrile, and the like. Among them, an acrylic resin that is highly transparent is preferred, and polymethylmethacrylate (PMMA) is particularly preferred.

The shape of the resin beads 14 is not particularly limited, and examples thereof include spherical, cubic, needle-like, rod-like, spindle, platy, flaky, fibrous and the like, and among them, the shape is preferably spherical having superior light diffusibility.

The resin beads 14 in the light diffusion layer 12 may be in contact with the front face of the substrate layer 11; however, it is preferred that the resin beads 14 are substantially spaced away from the substrate layer 11. In the upper side light diffuser sheet 5, for example, using an active energy ray-curable resin as the principal component of the resin matrix 13, a coating liquid containing the resin beads 14 dispersed in the active energy ray-curable resin is applied on the front face of the substrate layer 11, and then the active energy ray-curable resin is allowed to be hardened in a state in which the resin beads 14 are spaced away from the front face of the substrate layer 11, whereby the resin beads 14 can be fixed in the state being spaced away from the front face of the substrate layer 11. In the upper side light diffuser sheet 5, due to the resin beads 14 being substantially spaced away from the front face of the substrate layer 11, fine and highly dense irregularities can be easily formed on the front face of the light diffusion layer 12, and the generation of the sparkle resulting from the interference with the pixel pitch of the liquid crystal panel can be more accurately inhibited. It is to be noted that the expression "resin beads being spaced away from the front face of the substrate layer" as referred to indicates a conception in which other resin beads being in contact the resin beads that are in contact with the front face of the substrate layer but not being in direct contact with the front face of the substrate layer are also included. In addition, as to whether or not the resin beads are spaced away from the front face of the substrate layer can be ascertained, for example, by observing the cross section along the thickness direction of the upper side light diffuser sheet with a laser microscope.

The resin beads 14 include a first resin bead group 14a and a second resin bead group 14b having different average particle diameters D50. It is to be noted that the average particle diameter D50 means a median (center) value of the particle diameter distribution in each resin bead group.

For example, the average particle diameter D50 of the first resin bead group 14a is 1.9 μm or more and 3.3 μm or less. When the average particle diameter D50 of the first resin bead group 14a is less than the lower limit, the irregularities on the front face of the light diffusion layer 12 may be too small and the light diffusibility becomes insufficient, and it may be impossible to sufficiently inhibit luminance unevenness resulting from the shape and the like of the prism portions of the prism sheet 4 and generation of the sparkle resulting from the interference with the pixel pitch of the liquid crystal panel. To the contrary, when the average particle diameter D50 of the first resin bead group 14a is greater than the upper limit, comparatively large irregularities are formed on the front face of the light diffusion layer 12 in a too large number, and thus it may be impossible to sufficiently inhibit the generation of the sparkle resulting from the interference with the pixel pitch of the liquid crystal panel.

The average particle diameter D50 of the second resin bead group 14b is larger than the average particle diameter D50 of the first resin bead group 14a. For example, the average particle diameter D50 of the second resin bead group 14b is 5.0 μm or more and 6.5 μm or less. When the average particle diameter D50 of the second resin bead group 14b is less than the lower limit, a difference from the average particle diameter D50 of the second resin bead group 14b is too small and the front face of the light diffusion layer 12 is easily scratched, thus the assembly yield of the upper side light diffuser sheet 5 becomes worse. To the contrary, when the average particle diameter D50 of the second resin bead group 14b exceeds the upper limit, the difference from the average particle diameter D50 of the second resin bead group 14b is too large, and at the time of manufacturing the light diffusion layer 12, when a solution containing the resin beads 14, the resin matrix 13 and a solvent is applied to the substrate layer 11, uneven coating easily occurs. The uneven coating causes the generation of sparkle.

Thus, by mixing and using a plurality of resin bead groups having different average particle diameters D50, it is possible to obtain the upper side light diffuser sheet 5 in which the generation of sparkle is inhibited and the front face is hardly scratched. That is, the generation of sparkle is inhibited by the first resin bead group having a small average particle diameter D50, while the front face of the light diffusion layer 12 is prevented from being scratched by the second resin bead group having a large average particle diameter D50.

The mass ratio of the second resin bead group 14b in the entire resin beads 14 is 30% or more and 50% or less, and preferably 40%, for example. That is, the mass ratio of the second resin bead group 14b to the first resin bead group 14a is 0.43 or more and 1.0 or less, and preferably 0.65, for example. When the mass ratio of the second resin bead group 14b exceeds the upper limit of the above range, the haze value decreases, and the light diffusibility as the upper side light diffuser sheet 5 cannot be maintained. On the other hand, when the mass ratio of the second resin bead group 14b is below the lower limit of the above range, the front face of the upper side light diffuser sheet 5 is easily scratched, and sparkle is easily generated. Therefore, the mass ratio of the second resin bead group 14b in the entire resin beads 14 is within the above range, whereby it is possible to prevent the upper side light diffuser sheet 5 from being scratched while maintaining the light diffusibility.

The coating amount of the light diffusion layer 12 is larger than 1.7 g/m$^2$ and smaller than 3.0 g/m$^2$, and preferably 2.5 g/m$^2$, for example. It is to be noted that the coating amount of the light diffusion layer 12 means a weight per unit area of the light diffusion layer 12 containing the resin beads 14 and the resin matrix 13 as a principal component after applying the solution containing the resin beads 14, the resin matrix 13 and a solvent to the substrate layer 11 and then drying the solution to evaporate the solvent. When the coating amount of the light diffusion layer 12 exceeds the upper limit of the above range, the thickness of the light diffusion layer 12 increases, and the resin beads 14 are buried in the resin matrix 13. As a result, an interval between adjacent resin beads 14 is widened, and the haze value decreases. Further, since the coating amount is large, the resin beads 14 in the light diffusion layer 12 are likely to be biased, and sparkle is easily generated. On the other hand, when the coating amount of the light diffusion layer 12 is below the lower limit of the above range, the thickness of the light diffusion layer 12 is thinned, and the resin beads 14 cannot be accurately fixed by the resin matrix 13. As a result, the resin beads 14 are easily peeled off from the light diffusion layer 12. In addition, when the resin beads 14 are detached, the resin beads 14 are likely to be biased and sparkle is easily generated, or the interval between the adjacent resin beads 14 is narrowed, the haze value becomes too high, and the luminance decreases. Therefore, when the coating amount of the light diffusion layer 12 is set within the above range, it is possible to inhibit the generation of sparkle while maintaining a high and appropriate haze value.

As described above, according to the above structure, the resin beads 14 include the first resin bead group 14a having a relatively small average particle diameter and the second resin bead group 14b having an average particle diameter larger than that of the first resin bead group 14a, and the mass ratio of which is within the above range, whereby it is possible to prevent the upper side light diffuser sheet 5 from being scratched while maintaining the light diffusibility. Furthermore, when the coating amount of the light diffusion layer 12 is set within the above range, it is possible to inhibit the generation of sparkle while maintaining a high and appropriate haze value. Therefore, by setting the mass ratio of the first resin bead group 14a and the second resin bead group 14b and the coating amount of the light diffusion layer 12 within the above ranges, respectively, the generation of sparkle can be inhibited while maintaining the high light diffusibility required as the upper side light diffuser sheet 5.

The mass content of the resin beads 14 (the total amount of the first resin bead group 14a and the second resin bead group 14b) in the light diffusion layer 12 is 37% or more and 47% or less, for example, preferably 41% or more and 45% or less, and for example, more preferably 42.7%. When the mass content of the resin beads 14 is small and below the lower limit of the above range, the haze value decreases, and sparkle is easily generated. On the other hand, when the mass content of the resin beads 14 is high and exceeds the upper limit of this range, the haze value becomes excessively high, and the luminance decreases. Therefore, by setting the mass content of the resin beads 14 in the light diffusion layer 12 in the above range, high luminance can be obtained while inhibiting the generation of sparkle.

The light diffusion layer 12 may have a minimum thickness of 1 μm or less in a region where the resin beads 14 are not present in the thickness direction, that is, a region where only the resin matrix 13 is present in the thickness direction. When the minimum thickness of the light diffusion layer 12 (layer only of the resin matrix 13) where the resin beads 14 are not present in the thickness direction is greater than 1 μm, an area of the resin beads 14 embedded in the resin matrix 13 increases, and a convex shape of the resin bead 14 is not formed as the original design. That is, convex portions generated by the resin beads 14 in the light diffusion layer 12 are lowered, and light diffusion performance is lowered. For this reason, by setting the minimum thickness to 1 μm or less, the generation of sparkle can be more effectively inhibited.

The density of the resin beads 14 per unit area is preferably 12000 pieces/mm$^2$ or more and 20000 pieces/mm$^2$ or less, and further preferably 15400 pieces/mm$^2$, for example. When the density of the resin beads 14 per unit area is less than the lower limit, it may be impossible to sufficiently inhibit the luminance unevenness resulting from the shape and the like of protruding prism portions of the prism sheet 4, and densification of the irregularities on the front face of the light diffusion layer 12 may be insufficient, whereby it may be impossible to sufficiently inhibit the generation of the sparkle resulting from the interference with the pixel pitch of the liquid crystal panel. To the contrary, when the density of the resin beads 14 per unit area is greater than the upper limit, rays of light that enter from the back face side are diffused beyond necessity, the luminance of the liquid crystal display device may be lowered.

The upper limit of a coefficient of variation of the particle diameter in a volume-weighted particle size distribution of the resin beads 14 is preferably 42%, more preferably 41%, further preferably 40%, and particularly preferably 39%. When the coefficient of variation is greater than the upper limit, comparatively large irregularities are formed on the front face of the light diffusion layer 12 in a too large number, and thus it may be impossible to sufficiently inhibit the generation of the sparkle resulting from the interference with the pixel pitch of the liquid crystal panel. On the other hand, the lower limit of the coefficient of variation is preferably 30%, and more preferably 35%. When the coefficient of variation is less than the lower limit, the irregularities on the front face of the light diffusion layer 12 are too much uniformized, and thus it may be impossible to suitably diffuse the rays of light.

The lower limit of a refractive index of the resin beads 14 is preferably 1.46, and more preferably 1.48. On the other hand, the upper limit of the refractive index of the resin beads 14 is preferably 1.60, and more preferably 1.59. When the refractive index of the resin beads 14 is thus set within the above range, a difference in the refractive index from the resin matrix 13 can be appropriately adjusted, and accordingly, luminance unevenness resulting from the shape and the like of protruding prism portions 16 of the prism sheet 4 can be readily inhibited as described later. It is to be noted that the "refractive index" as referred to means a refractive index for light with a wavelength of 589.3 nm (sodium D my).

The lower limit of the haze value of the upper side light diffuser sheet 5 is preferably 50%, and more preferably 52%. On the other hand, the upper limit of the haze value of the upper side light diffuser sheet 5 is preferably 70%, and more preferably 68%. When the haze value of the upper side light diffuser sheet 5 is less than the lower limit, it may be impossible to sufficiently inhibit the luminance unevenness resulting from the shape and the like of protruding prism portions of the prism sheet 4, and the generation of the sparkle resulting from the interference with the pixel pitch of the liquid crystal panel. To the contrary, when the haze value of the upper side light diffuser sheet 5 is greater than the upper limit, the luminance of the liquid crystal display device may be insufficient. It is to be noted that the "haze value" as referred to means a value determined in accordance with JIS-K7361:2000.

<Prism Sheet>

Since the prism sheet 4 is required to transmit rays of light, the prism sheet 4 is formed mainly of a synthetic resin that is transparent, particularly colorless transparent. The prism sheet 4 includes a substrate layer 15, and projection lines constituted with a plurality of protruding prism portions 16 overlaid on a front face of the substrate layer 15. The protruding prism portions 16 are overlaid on the front face of the substrate layer 15 in a striped pattern. The protruding prism portion 16 is triangular prism-shaped, with a back face thereof being in contact with the front face of the substrate layer 15.

The lower limit of the thickness of the prism sheet 4 (the level from the back face of the substrate layer 15 to a vertex of the protruding prism portion 16) is preferably 50 μm, and more preferably 70 μm. On the other hand, the upper limit of the thickness of the prism sheet 4 is preferably 200 μm, and more preferably 180 μm. Further, the lower limit of pitch p of the protruding prism portions 16 of the prism sheet 4 (see FIG. 2) is preferably 20 μm, and more preferably 30 μm. On the other hand, the upper limit of the pitch p of the protruding prism portions 16 of the prism sheet 4 is preferably 100 μm, and more preferably 60 μm. In addition, a vertical angle of the protruding prism portion 16 is preferably 85° or more and 95° or less. Moreover, the lower limit of a refractive index of the protruding prism portion 16 is preferably 1.5, and more preferably 1.55. On the other hand, the upper limit of the refractive index of the protruding prism portion 16 is preferably 1.7.

It is to be noted that the backlight unit is not necessarily limited to one having only one prism sheet 4, and may have other prism sheet superposed on the prism sheet 4. In such a case, it is preferred that ridgelines of a plurality of protruding prism portions 16 of the prism sheet 4 are perpendicular to ridgelines of a plurality of protruding prism portions of the other prism sheet. When the ridgelines of the protruding prism portion 16 of the prism sheet 4 are thus perpendicular to the ridgelines of the protruding prism portions of the other prism sheet, rays of light that enter from the lower side light diffuser sheet 3 are refracted toward the normal direction side by one prism sheet, and further the rays of light that exit from the one prism sheet can be refracted by the other prism sheet so as to proceed substantially perpendicularly to the back face of the upper side light diffuser sheet 5. It is to be noted that a forming material, a thickness, a pitch of the protruding prism portions, a vertical angle of the protruding prism portion, and a refractive index of the protruding prism portion of the other prism sheet can be similar to those of the prism sheet 4.

<Light Guide Sheet>

The light guide sheet 1 is a sheet-shaped optical member that allows rays of light exiting from the light source 2 to exit from the front face thereof, while permitting propagation of the rays of light inside. The light guide sheet 1 may be formed to have a substantially wedge shape in cross section, or may be formed to be substantially tabular. Since the light guide sheet 1 is required to have translucency, the light guide sheet 1 is formed mainly of a resin that is transparent, particularly colorless and transparent. The principal component of the light guide sheet 1 is not particularly limited, and examples thereof include synthetic resins such as a polycarbonate that is superior in transparency, strength and the like, and an acrylic resin that is superior in transparency, scuff resistance and the like. Among them, the principal component of the light guide sheet 1 is preferably a polycarbonate. Since a polycarbonate has superior transparency and a high refractive index, total reflection readily occurs at an interface with an air layer (a layer formed in a gap from the lower side light diffuser sheet 3 disposed on the front face side of the light guide sheet 1; and a layer formed in a gap from the reflection sheet 6 disposed on the back face side of the light guide sheet 1), thereby enabling the rays of light to be efficiently propagated. In addition, due to having heat resistance, a polycarbonate is less likely to be accompanied by deterioration and the like resulting from heat generation by the light source 2.

<Light Source>

The light source 2 is disposed such that an irradiated face is opposed to (or in contact with) an end face of the light guide sheet 1. A variety of light sources 2 can be used, and for example, a light emitting diode (LED) can be used. Specifically, a plurality of light emitting diodes may be disposed along the end face of the light guide sheet 1 for use as the light source 2.

<Lower Side Light Diffuser Sheet>

The lower side light diffuser sheet 3 includes a substrate layer 17, a light diffusion layer 18 disposed on the front face side of the substrate layer 17, and a sticking preventive layer 19 disposed on the back face side of the substrate layer 17. The substrate layer 17 of the lower side light diffuser sheet 3 can have a similar structure to the substrate layer 11 of the upper side light diffuser sheet 5 described above. The light diffusion layer 18 of the lower side light diffuser sheet 3 includes a light diffusion material, and a resin matrix thereof.

<Reflection Sheet>

Examples of the reflection sheet 6 include a white sheet in which a filler is contained through dispersion in a base resin such as a polyester, a mirror sheet having enhanced regular reflection through vapor deposition of a metal such as aluminum or silver on the surface of a film formed of a polyester or the like, and the like.

<Advantages>

According to the upper side light diffuser sheet 5 in the present embodiment, since the light diffusion layer 12 has the resin matrix 13 and the resin beads 14, irregularities resulting from the resin beads 14 are formed on the front face of the light diffusion layer 12. Therefore, the upper side light diffuser sheet 5 can inhibit luminance unevenness resulting from the shape and the like of the protruding prism portions 16 of the prism sheet 4 by allowing rays of light having entered from the back face side to be diffused by means of the irregularities. Also, the resin beads 14 include the first resin bead group 14a having a relatively small average particle diameter and the second resin bead group 14b having an average particle diameter larger than that of the first resin bead group 14a, and the mass ratio of which is within the above range, whereby it is possible to prevent the upper side light diffuser sheet 5 from being scratched while maintaining the light diffusibility. Furthermore, when the coating amount of the light diffusion layer 12 is set within the above range, it is possible to inhibit the generation of sparkle while maintaining high haze. From the above, by setting the mass ratio of the first resin bead group 14a and the second resin bead group 14b and the coating amount of the light diffusion layer 12 within the above ranges, the generation of sparkle can be inhibited while maintaining the high light diffusibility required as the upper side light diffuser sheet 5.

Further, according to the backlight unit in the present embodiment, since the upper side light diffuser sheet 5 is superposed on the front face side of the prism sheet 4, luminance unevenness resulting from the shape and the like of the protruding prism portions 16 of the prism sheet 4 can be inhibited by allowing rays of light that exit from the prism sheet 4 to be diffused by means of the irregularities formed on the front face of the light diffusion layer 12 of the upper side light diffuser sheet 5. Also, in the backlight unit, the upper side light diffuser sheet 5 includes the first resin bead group 14a having a relatively small average particle diameter of the resin beads 14 and the second resin bead group 14b having an average particle diameter of the resin beads larger than that of the first resin bead group 14a, and the mass ratio of which is within the above range, so that it is possible to prevent the upper side light diffuser sheet from being scratched while maintaining the light diffusibility.

<Production Method of Upper Side Light Diffuser Sheet>

A production method of the upper side light diffuser sheet 5 in the present embodiment includes the steps of forming a sheet element that constitutes the substrate layer 11 (substrate layer forming step); and overlaying the light diffusion layer 12 on at least one face side of the sheet element (light diffusion layer overlaying step).

(Substrate Layer Forming Step)

The substrate layer forming step is not particularly limited, and a procedure including subjecting a molten thermoplastic resin to extrusion molding through a T die and subsequently forming a sheet element by drawing the extrusion-molded product in a longitudinal direction and a width direction of the layer may be exemplified. Examples of well-known extrusion molding process employing the T die include a polishing roll process and a chin roll process. Also, examples of film drawing process of the sheet element include a biaxial drawing process for tubular films, a biaxial drawing process for flat films, and the like.

(Light Diffusion Layer Overlaying Step)

The light diffusion layer overlaying step includes the steps of preparing a coating liquid containing the resin matrix 13 and the resin beads 14 (preparation step), applying the coating liquid prepared in the preparation step on one face side of the sheet element (applying step), and hardening through drying the coating liquid applied in the applying step (hardening step).

In the preparation step, a solution (coating liquid) in which the resin matrix 13 and the resin beads 14 including the first resin bead group 14a and the second resin bead group 14b are mixed with a solvent is prepared. As the solvent, for example, methyl ethyl ketone, toluene, ethyl acetate, butyl acetate or the like is used.

Further, for example, an active energy ray-curable resin is used as a principal component of the resin matrix 13. Thereby, it is easy to comparatively quickly harden the active energy ray-curable resin after applying the coating liquid in the applying step, through irradiating the resin with, for example, a ultraviolet ray in the hardening step. Thus, by hardening the active energy ray-curable resin in a state in which the resin beads 14 are spaced away from one face of the sheet element, the resin beads 14 can be readily fixed in a state of being spaced away from one face of the sheet element.

Further, the mass content (the mass content of the solid content in the coating liquid) of the resin beads 14 and the resin matrix 13 in the coating liquid (that is, the state before drying) prepared in the preparation step is 50% or more and 60% or less, and preferably 55%, for example.

When the solvent amount of the coating liquid is small and the mass content of the resin beads 14 and the resin matrix 13 exceeds the upper limit of this range, the coating amount after drying cannot be inhibited to the above range, the haze value decreases, and sparkle is easily generated. On the other hand, when the amount of solvent in the coating liquid increases and the mass content of the resin beads 14 and the resin matrix 13 is below the lower limit of this range, the specific gravity of the coating liquid decreases, so that the resin beads 14 with high specific gravity easily settle. For this reason, in the step of applying the coating liquid to the substrate layer 11 and then drying it, the resin beads 14 flow, and the resin beads 14 are easily biased in the formed light diffusion layer 12. As a result, sparkle is easily generated. Therefore, by setting the mass content of the resin beads 14 and the resin matrix 13 in the coating liquid within the above range, the generation of sparkle can be more effectively inhibited.

It is to be noted that the production method of the upper side light diffuser sheet in the present embodiment may further include before the light diffusion layer overlaying step, a surface treatment step of subjecting a face of the sheet element on a side where the light diffusion layer is to be overlaid, to a corona discharge treatment, an ozone treatment, a low-temperature plasma treatment, a glow discharge treatment, an oxidization treatment, a primer coating treatment, an undercoating treatment, an anchor coating treatment, or the like.

[Modified Example of Upper Side Light Diffuser Sheet]

The upper side light diffuser sheet 25 shown in FIG. 3 may be used in the backlight unit shown in FIG. 1, in place of the upper side light diffuser sheet 5 shown in FIG. 1. The upper side light diffuser sheet 25 in this modified example allows rays of light that enter from the back face side to be diffused to some extent, thereby inhibiting luminance unevenness resulting from the shape and the like of protruding prism portions of the prism sheet, and inhibiting the generation of the sparkle resulting from the interference with the pixel pitch of a liquid crystal panel (not shown) disposed on the front face side of the upper side light diffuser sheet 25. The upper side light diffuser sheet 25 includes a substrate layer 11, a light diffusion layer 12 overlaid on the front face side of the substrate layer 11, and a sticking preventive layer 26 overlaid on the back face side of the substrate layer 11. The upper side light diffuser sheet 25 is constituted as a three-layer structure that includes the substrate layer 11, the light diffusion layer 12 overlaid directly on the front face of the substrate layer 11, and the sticking preventive layer 26 overlaid directly on the back face of the substrate layer 11. Since the substrate layer 11 and the light diffusion layer 12 of the upper side light diffuser sheet 25 are similar to those of the upper side light diffuser sheet 5 shown in FIG. 1, description of these is omitted by denoting each identical reference number.

(Sticking Preventive Layer)

The sticking preventive layer 26 constitutes the back face of the upper side light diffuser sheet 25 in this modified example. Since the sticking preventive layer 26 is required to transmit rays of light, the sticking preventive layer 26 is formed mainly of a synthetic resin that is transparent, particularly colorless transparent. The sticking preventive layer 26 is constituted to be a film form having a substantially even thickness and having a flat back face. The sticking preventive layer 26 is constituted so as to be partially in contact with tops of the protruding prism portions of the prism sheet disposed on the back face side of the upper side light diffuser sheet 25, thereby preventing the sticking with the prism sheet. Examples of the principal component of the sticking preventive layer 26 include a polycarbonate, an acrylic resin, polyethylene terephthalate, polyethylene naphthalate, a polystyrene, a methyl (meth) acrylate-styrene copolymer, a polyolefin, a cycloolefin polymer, a cycloolefin copolymer, cellulose acetate, weather resistant vinyl chloride, an active energy ray-curable resin, and the like. Among them, an acrylic resin is preferred which enhances the strength of the back face of the upper side light diffuser sheet 25, and thus the scratch on the back face is likely to be prevented.

The lower limit of the average thickness of the sticking preventive layer 26 is preferably 1 µm, and more preferably 2 µm. On the other hand, the upper limit of the average thickness of the sticking preventive layer 26 is preferably 10 µm, and more preferably 8 µm. When the average thickness of the sticking preventive layer 26 is less than the lower limit, it may be impossible to accurately prevent the scratch on the back face of the upper side light diffuser sheet 25. To the contrary, when the average thickness of the sticking preventive layer 26 is greater than the upper limit, the luminance of the liquid crystal display device may be lowered.

The upper limit of arithmetic average roughness Ra of the back face of the sticking preventive layer 26 is preferably 0.04 µm, more preferably 0.035 µm, and further preferably 0.03 µm. When the arithmetic average roughness Ra of the back face of the sticking preventive layer 26 is greater than the upper limit, the scratch may be generated at the protruding prism portions of the prism sheet resulting from the contact with the sticking preventive layer 26. It is to be noted that the lower limit of the arithmetic average roughness Ra of the back face of the sticking preventive layer 26 is not particularly limited, and may be, for example, 0.01 µm.

<Production Method of Upper Side Light Diffuser Sheet in Modified Example>

A production method of an upper side light diffuser sheet 25 in this modified example includes the steps of forming a sheet element that constitutes the substrate layer 11 (substrate layer forming step), overlaying the light diffusion layer 12 on at least one face side of the sheet element (light diffusion layer overlaying step), and overlaying the sticking preventive layer 26 on other face side of the sheet element that constitutes the substrate layer 11 (sticking preventive layer overlaying step).

(Sticking Preventive Layer Overlaying Step)

As the sticking preventive layer overlaying step, a procedure of forming the sticking preventive layer 26 concomitantly with the sheet element that constitutes the substrate layer 11 by a coextrusion process and a procedure of overlaying the sticking preventive layer 26 by coating on the other face side of the sheet element may be exemplified.

It is to be noted that the substrate layer forming step in the production method of the upper side light diffuser sheet 25 in this modified example may be carried out concomitantly with the sticking preventive layer overlaying step by a coextrusion process as described above, or may be carried out separately from the sticking preventive layer overlaying step. In the case of carrying out the substrate layer forming step separately from the sticking preventive layer forming step, the substrate layer forming step can be carried out by a similar procedure to the substrate layer forming step of the upper side light diffuser sheet 5 shown in FIG. 1. Furthermore, the light diffusion layer overlaying step in the production method of the upper side light diffuser sheet 25 can be carried out by a similar procedure to the light diffusion layer overlaying step in the production method of the upper side light diffuser sheet 5 shown in FIG. 1.

<Advantages>

Since the sticking preventive layer 26 is overlaid on the back face side of the substrate layer 11, the upper side light diffuser sheet 25 in this modified example inhibits the luminance unevenness resulting from the shape and the like of protruding prism portions of a prism sheet, can inhibit the generation of the sparkle resulting from the interference with the pixel pitch of the liquid crystal panel, and also can increase a sticking preventive property with the prism sheet and a scratch preventive property of the back face of the upper side light diffuser sheet 25.

[Liquid Crystal Display Module]

The liquid crystal display module shown in FIG. 4 includes the light guide sheet 1 that guides rays of light that enter from an end face to the front face side, the light source 2 that allows the end face of the light guide sheet 1 to be irradiated with the rays of light, the lower side light diffuser sheet 3 superposed on the front face side of the light guide sheet 1, the prism sheet 4 disposed on the front face side of the lower side light diffuser sheet 3, the upper side light diffuser sheet 5 superposed on the front face side of the prism sheet 4, the reflection sheet 6 disposed on the back face side of the light guide sheet 1, and a liquid crystal panel 31 superposed on the front face side of the upper side light diffuser sheet 5. In other words, the liquid crystal display module has a constitution in which the liquid crystal panel 31 is disposed on the front face side of the upper side light diffuser sheet 5 in the backlight unit shown in FIG. 1.

<Liquid Crystal Panel>

The liquid crystal panel 31 is disposed directly (without any other sheet or the like being interposed) on the front face of the upper side light diffuser sheet 5. The liquid crystal panel 31 has a front face side-polarizing plate 32 and a back face side-polarizing plate 33 which are disposed in a substantially parallel manner with a certain interval, and a liquid crystal cell 34 disposed therebetween. The front face side-polarizing plate 32 and the back face side-polarizing plate 33 are, for example, constituted with polarizers such as an iodine-based polarizer, a dye-based polarizer and a polyene-based polarizer, and a pair of transparent protective films disposed on both sides of the same. The front face side-polarizing plate 32 and the back face side-polarizing plate 33 are orthogonal each other with respect to their transmission axial orientations.

The liquid crystal cell 34 has a function to control the amount of transmitted light, and a variety of well-known ones may be employed. The liquid crystal cell 34 has generally a layer structure constituted with a basal plate, a color filter, a counter electrode, a liquid crystal layer, a pixel electrode, a basal plate, and the like. For this pixel electrode, a transparent conductive film such as ITO may be used. As a display mode of the liquid crystal cell, for example, TN (Twisted Nematic), VA (Vertical Alignment), IPS (In-Place Switching), FLC (Ferroelectric Liquid Crystal), AFLC (Anti-ferroelectric Liquid Crystal), OCB (Optically Compensatory Bend), STN (Supper Twisted Nematic), HAN (Hybrid Aligned Nematic) or the like can be used. A pixel pitch of the liquid crystal panel 31 (pixel pitch of the liquid crystal cell) can be, for example, 25 μm or less.

<Advantages>

The liquid crystal display module in the present embodiment includes the upper side light diffuser sheet 5 shown in FIG. 1, and thus can inhibit the luminance unevenness resulting from the shape and the like of the protruding prism portions 16 of the prism sheet 4. In addition, the liquid crystal display module in the present embodiment is disposed with the upper side light diffuser sheet 5 shown in FIG. 1 on the back face side of the liquid crystal panel 31, and thus can inhibit the generation of the sparkle resulting from the interference between the irregularities formed on the front face of the light diffusion layer 12 of the upper side light diffuser sheet 5 and the pixel pitch of the liquid crystal panel 31.

Other Embodiments

Additionally, the upper side light diffuser sheet and the backlight unit according to the present invention can be practiced in various modified or improved embodiments other than those as described above. For example, the backlight unit may include an optical sheet other than the upper side light diffuser sheet, the prism sheet and the lower side light diffuser sheet, on the front face side of the light guide sheet. Moreover, the backlight unit may not necessarily be the edge light backlight unit, and may be, for example, a direct light backlight unit in which a diffusion plate and a light source are disposed on the back face side of the lower side light diffuser sheet.

Specific structures of the prism sheet, the light diffuser sheet, the light guide sheet, the light source and the reflection sheet in the backlight unit are not particularly limited, and a variety of structures can be adopted.

The upper side light diffuser sheet preferably has a two-layer structure including a substrate layer and a light diffusion layer, or has a three-layer structure including a substrate layer, a light diffusion layer and a sticking preventive layer; however, other layer may be included between the substrate layer and the light diffusion layer, or between the substrate layer and the sticking preventive layer.

The backlight unit can be used for comparatively large visual display units such as personal computers and liquid crystal televisions, mobile phone terminals such as smartphones, and portable information terminals such as tablet terminals.

EXAMPLES

Hereinafter, the present invention will be described in further detail by way of examples, but the present invention is not in any way limited to these examples. In the following examples and comparative examples, the upper side light diffuser sheet was actually produced, and it was visually confirmed whether or not sparkle was generated.

Example 1

A light diffusion layer in which resin beads were dispersed in a resin matrix containing a ultraviolet-curable resin as a principal component was overlaid on a front face of a substrate layer containing polyethylene terephthalate as a principal component and having an average thickness of 75 μm to produce an upper side light diffuser sheet of Example 1. At this time, the mass ratio of a first resin bead group and a second resin bead group in the resin beads was set to 60%:40%, that is, the mass ratio of the second resin bead group in the entire resin beads was set to 40%. Here, the average particle diameter D50 of the first resin bead group is 2.6 μm, and the average particle diameter D50 of the second resin bead group is 5.8 μm. The average particle diameter D50 based on a volume-weighted particle size distribution of the resin beads in the light diffusion layer was measured using "Laser Scattering Particle Size Distribution Analyzer LA-950" manufactured by Horiba, Ltd.

Also, the coating amount of this light diffusion layer was set to 2.5 g/m². The coating amount was measured as follows. First, the upper side light diffuser sheet was cut into 10 cm×10 cm, and the weight (A) was measured with a precision balance. A measurement surface (coating surface) was wiped with a cloth soaked in an organic solvent such as MEK, and a layer on the coating surface was peeled off, then the weight (B) was measured. A value obtained by subtracting the weight (B) after wiping the coating surface from the original sample weight (A) was multiplied by 100 to calculate the weight per square meter.

Moreover, the mass content of the resin beads in the light diffusion layer was set to 42.7%. In addition, the mass content of the resin beads and the resin matrix in the coating liquid when producing the light diffusion layer (the mass content of the solid content in the coating liquid) was set to 55%.

Further, in the production of the upper side light diffuser sheet in Example 1, by controlling the film thickness by roll coating technique, the minimum thickness of the light diffusion layer in a region where the resin beads were not present in the thickness direction (region only of the resin matrix) was set to be greater than 0 and 1 μm or less.

<Data on Mass Ratio of Second Resin Bead Group>

Comparative Example 1

An upper side light diffuser sheet of Comparative Example 1 was produced in a similar manner to Example 1 except that the mass ratio of the first resin bead group and the second resin bead group in the resin beads was set to 20%: 80%, that is, the mass ratio of the second resin bead group in the entire resin beads was set to 80%.

(Comparison)

A comparison between Example 1 and Comparative Example 1 is shown in the following table.

TABLE 1

| | Mass ratio of second resin beads (%) | Coating amount (g/m²) | Mass content of resin beads (%) | Mass content of solid content in coating liquid (%) | Inhibition of sparkle |
|---|---|---|---|---|---|
| Example 1 | 40 | 2.5 | 42.7 | 55 | ⊚ (Very good) |
| Comparative Example 1 | 80 | 2.9 | 42.7 | 55 | Δ (Not so good) |

In addition, in the item of inhibition of sparkle in the table above, as a result of visual inspection, the evaluation was conducted as follows: those in which sparkle was remarkably inhibited (no sparkle was not be observed at all) as double circles (very good), those in which sparkle could be sufficiently inhibited (those in which sparkle could be found by thorough observation, but no sparkle could be found by common visual observation) as circle (good), those in which sparkle was not sufficiently inhibited (those in which sparkle was found by common visual observation) as triangle (not so good), and those in which sparkle could not be inhibited (those in which a lot of sparkles were found by common visual observation) as cross (poor). The same evaluation was also conducted in the following table.

As shown in the table above, as in Comparative Example 1, when the mass ratio of the second resin beads exceeded 50%, sparkle was not sufficiently inhibited. On the other hand, as in Example 1, when the mass ratio of the second resin beads was in the range of 30% or more and 50% or less, inhibition of sparkle could be remarkably realized. In addition, when the mass ratio of the second resin beads is less than 30%, it cannot be adopted as the upper side light diffuser sheet from the viewpoint that it is not possible to prevent the upper side light diffuser sheet from being scratched, so that the evaluation by the above visual inspection is not conducted.

<Data on Coating Amount>

Example 2

An upper side light diffuser sheet of Example 2 was produced in a similar manner as in Example 1 except that the coating amount of the light diffusion layer was changed to 2.9 g/m².

Example 3

An upper side light diffuser sheet of Example 3 was produced in a similar manner as in Example 1 except that the coating amount of the light diffusion layer was changed to 1.8 g/m².

Comparative Example 2

An upper side light diffuser sheet of Comparative Example 2 was produced in a similar manner as in Example 1 except that the coating amount of the light diffusion layer was changed to 3.0 g/m².

Comparative Example 3

An upper side light diffuser sheet of Comparative Example 3 was produced in a similar manner as in Example 1 except that the coating amount of the light diffusion layer was changed to 1.7 g/m².

(Comparison)

A comparison between Examples 1 to 3 and Comparative Examples 2 to 3 is shown in the following table.

TABLE 2

|  | Mass ratio of second resin beads (%) | Coating amount (g/m²) | Mass content of resin beads (%) | Mass content of solid content in coating liquid (%) | Inhibition of sparkle |
|---|---|---|---|---|---|
| Comparative Example 2 | 40 | 3.0 | 42.7 | 55 | X (Poor) |
| Example 2 | 40 | 2.9 | 42.7 | 55 | ○ (Good) |
| Example 1 | 40 | 2.5 | 42.7 | 55 | ⊚ (Very good) |
| Example 3 | 40 | 1.8 | 42.7 | 55 | ⊚ (Very good) |
| Comparative Example 3 | 40 | 1.7 | 42.7 | 55 | — |

As shown in the table above, as in Comparative Example 2, when the coating amount exceeded 2.9 g/m², a lot of sparkles were found. In addition, when trying to produce a light diffusion layer with a coating amount of less than 1.8 g/m² as in Comparative Example 3, the resin beads 14 were peeled off, and it was difficult to produce the light diffusion layer with a coating amount of 1.7 g/m² or less. For this reason, the sparkle in Comparative Example 3 could not be evaluated by the above visual inspection. On the other hand, as in Examples 1 to 3, when the coating amount was in the range of 1.8 to 2.9 g/m², inhibition of sparkle could be realized.

<Data on Mass Content of Resin Beads in Light Diffusion Layer>

Example 4

An upper side light diffuser sheet of Example 4 was produced in a similar manner as in Example 1 except that the mass content of the resin beads in the light diffusion layer was changed to 45.0%.

Example 5

An upper side light diffuser sheet of Example 5 was produced in a similar manner as in Example 1 except that the mass content of the resin beads in the light diffusion layer was changed to 41.0%.

Comparative Example 4

An upper side light diffuser sheet of Comparative Example 4 was produced in a similar manner as in Example 1 except that the mass content of the resin beads in the light diffusion layer was changed to 48.0%.

Comparative Example 5

An upper side light diffuser sheet of Comparative Example 5 was produced in a similar manner as in Example 1 except that the mass content of the resin beads in the light diffusion layer was changed to 38.0%.

(Comparison)

A comparison between Examples 1, 4 to 5 and Comparative Examples 4 to 5 is shown in the following table.

TABLE 3

|  | Mass ratio of second resin beads (%) | Coating amount (g/m²) | Mass content of resin beads (%) | Mass content of solid content in coating liquid (%) | Inhibition of sparkle |
|---|---|---|---|---|---|
| Comparative Example 4 | 40 | 2.5 | 48.0 | 55 | — |
| Example 4 | 40 | 2.5 | 45.0 | 55 | ○ (Good) |
| Example 1 | 40 | 2.5 | 42.7 | 55 | ⊚ (Very good) |
| Example 5 | 40 | 2.5 | 41.0 | 55 | ○ (Good) |
| Comparative Example 5 | 40 | 2.5 | 38.0 | 55 | Δ (Not so good) |

As shown in the above table, as in Comparative Example 4, when the mass content of the resin beads in the light diffusion layer exceeds 45.0%, the haze value increases and the luminance decreases, so that it was difficult to produce a light diffusion layer having a predetermined haze value (for example, 65%). For this reason, the evaluation of the sparkle in Comparative Example 4 by the above visual inspection is not conducted. Further, as in Comparative Example 5, although the practical quality was secured even when the mass content of the resin beads in the light diffusion layer was 38.0%, a relatively large number of sparkles were found. On the other hand, as in Examples 1 and 4 to 5, when the mass content of the resin beads in the light diffusion layer was in the range of 41.0 to 45.0%, inhibition of sparkle could be realized.

<Data on Thickness in Region Where Resin Beads Are Not Present in Thickness Direction of Light Diffusion Layer>

Example 6

A partial region of the upper side light diffuser sheet of Example 1 was cut out, and the minimum thickness (thickness at a downward arrow portion in FIG. 6A) in a region where the resin beads 14 were not present in the thickness direction in the light diffusion layer 12 (region only of the resin matrix 13) was measured. As shown in FIG. 6A, a sheet having a minimum thickness of 0.3 μm was defined as Example 6. The thickness was measured as follows. First, the produced upper side light diffuser sheet was cut into an appropriate size that was easy to process, and embedded with an epoxy resin 110. The embedded sample was processed using an ultra microtome (Power Tome XL manufactured by Boeckeler Instruments, Inc.) so that the cross section of the resin beads was exposed. The exposed cross section was observed with a laser microscope (VK-X200 manufactured by Keyence Corporation, laser wavelength: 405 nm), and the thickness (thickness of the substrate layer 11 from an interface with the light diffusion layer 12) at a position where no resin beads were present was measured.

Example 7

Another partial region of the upper side light diffuser sheet of Example 1 was cut out in a similar manner as in Example 6, and as shown in FIG. 6B, a sheet having a minimum thickness (thickness at a downward arrow portion in FIG. 6B) in a region where the resin beads were not present in the thickness direction in the light diffusion layer of 0.5 μm was defined as Example 7.

Comparative Example 6

An upper side light diffuser sheet of Comparative Example 6 was produced in a similar manner as in Example 1 except that the minimum thickness (thickness at downward arrow portions in FIG. 7A) in a region where the resin beads were not present in the thickness direction in the light diffusion layer was 1.1 μm, as shown in FIG. 7A. The thickness was measured in a similar manner as in Example 6.

Comparative Example 7

An upper side light diffuser sheet of Comparative Example 7 was produced in a similar manner as in Example 1 except that the minimum thickness (thickness at downward arrow portions in FIG. 7B) in a region where the resin beads were not present in the thickness direction in the light diffusion layer was 1.5 μm, as shown in FIG. 7B. The thickness was measured in a similar manner as in Example 6.

(Comparison)

A comparison between Examples 6 to 7 and Comparative Examples 6 to 7 is shown in the following table.

TABLE 4

| | Minimum thickness (μm) | Inhibition of sparkle |
|---|---|---|
| Example 6 | 0.3 | ◎ (Very good) |
| Example 7 | 0.5 | ◎ (Very good) |
| Comparative Example 6 | 1.1 | X (Poor) |
| Comparative Example 7 | 1.5 | X (Poor) |

As shown in the above table, when the minimum thickness in a region where the resin beads were not present in the thickness direction in the light diffusion layer exceeded 1.0 μm as in Comparative Examples 8 and 9, a lot of sparkles were found. On the other hand, when the minimum thickness in a region where the resin beads were not present in the thickness direction in the light diffusion layer was in the range of greater than 0 and 1.0 μm or less as in Examples 8 and 9, inhibition of sparkle could be realized.

[Evaluation Results]

As described above, it was proven that, in the upper side light diffuser sheets of Examples 1 to 7, the mass ratio of the second resin bead group shown in the entire resin beads was 30% or more and 50% or less, the coating amount of the light diffusion layer was 1.8 g/m² or more and 2.9 g/m² or less, the mass content of the resin beads in the light diffusion layer was 41% or more and 45% or less, and the minimum thickness in a region where the resin beads were not present in the thickness direction in the light diffusion layer was 1.0 μm or less, so that the generation of sparkle could be inhibited while maintaining the high light diffusibility required as the upper side light diffuser sheet. To the contrary, the upper side light diffuser sheets of Comparative Examples 1 to 7 were revealed to be not suitable as the upper side light diffuser sheet capable of inhibiting the generation of sparkle while maintaining the required high light diffusibility. More specifically, the upper side light diffuser sheets of Comparative Examples 1, 2, 5, 6, and 7 were revealed to be not capable of inhibiting the generation of sparkle. Further, it was proven that the upper side light diffuser sheet of Comparative Example 3 was difficult to produce, and that the upper side light diffuser sheet of Comparative Example 4 could not avoid reduction in luminance.

INDUSTRIAL APPLICABILITY

As described in the foregoing, the upper side light diffuser sheet and the backlight unit of the present invention are useful for inhibiting the generation of sparkle while maintaining the high light diffusibility required as the upper side light diffuser sheet.

REFERENCE SIGNS LIST 1 light guide sheet
2 light source
3 lower side light diffuser sheet
4 prism sheet
5 upper side light diffuser sheet
6 reflection sheet
11 substrate layer
12 light diffusion layer
13 resin matrix
14 resin beads
14a first resin bead group
14b second resin bead group
15 substrate layer
16 protruding prism portion
17 substrate layer 18 light diffusion layer
19 sticking preventive layer
25 upper side light diffuser sheet
26 sticking preventive layer
31 liquid crystal panel
32 front face side-polarizing plate
33 back face side-polarizing plate
34 liquid crystal cell
101 edge light backlight unit
102 light source
103 light guide plate
104 optical sheet
105 reflection sheet
106 lower side light diffuser sheet
107 prism sheet
108 upper side light diffuser sheet

The invention claimed is:

1. An upper side light diffuser sheet to be disposed on a front face side of a prism sheet in a backlight unit of a liquid crystal display device, the upper side light diffuser sheet comprising:
    a substrate layer, and a light diffusion layer overlaid on a front face side of the substrate layer, wherein
    the light diffusion layer includes a resin matrix, and resin beads dispersed in the resin matrix;
    the resin beads include a first resin bead group having an average particle diameter D50 of 1.9 μm or more and 3.3 μm or less, and a second resin bead group having an average particle diameter D50 larger than the average particle diameter D50 of the first resin bead group;
    a mass ratio of the second resin bead group in an entirety of the resin beads is 30% or more and 50% or less;
    a coating amount of the light diffusion layer is larger than 1.7 g/m$^2$ and smaller than 3.0 g/m$^2$; and
    wherein the light diffusion layer has a minimum thickness in a region where the resin beads are not present in a thickness direction of greater than 0 and 1 μm or less.

2. The upper side light diffuser sheet according to claim 1, wherein a mass content of the resin beads in the light diffusion layer is 41% or more and 45% or less.

3. The upper side light diffuser sheet according to claim 1, wherein the second resin bead group has an average particle diameter D50 of 5.0 μm or more and 6.5 μm or less.

4. A backlight unit for a liquid crystal display device, the backlight unit comprising:
    a light guide sheet that guides rays of light that enter from an end face to a front face side;
    a light source that allows an end face of the light guide sheet to be irradiated with rays of light;
    a lower side light diffuser sheet superposed on a front face side of the light guide sheet;
    a prism sheet disposed on a front face side of the lower side light diffuser sheet; and
    an upper side light diffuser sheet superposed on a front face side of the prism sheet,
    wherein the upper side light diffuser sheet comprises:
    a substrate layer, and a light diffusion layer overlaid on a front face side of the substrate layer, wherein
    the light diffusion layer includes a resin matrix, and resin beads dispersed in the resin matrix;
    the resin beads include a first resin bead group having an average particle diameter D50 of 1.9 μm or more and 3.3 μm or less, and a second resin bead group having an average particle diameter D50 larger than the average particle diameter D50 of the first resin bead group;
    a mass ratio of the second resin bead group in an entirety of the resin beads is 30% or more and 50% or less;
    a coating amount of the light diffusion layer is larger than 1.7 g/m$^2$ and smaller than 3.0 g/m$^2$; and
    wherein the light diffusion layer has a minimum thickness in a region where the resin beads are not present in a thickness direction of greater than 0 and 1 μm or less.

\* \* \* \* \*